(12) United States Patent
Landvik

(10) Patent No.: US 6,981,723 B2
(45) Date of Patent: Jan. 3, 2006

(54) THREADED ATTACHMENT

(76) Inventor: Timothy Landvik, 16435 Chicago Ave., Riverside, CA (US) 92504

( * ) Notice: Subject to any disclaimer, the term of this patent is extended or adjusted under 35 U.S.C. 154(b) by 74 days.

(21) Appl. No.: 10/820,936

(22) Filed: Apr. 9, 2004

(65) Prior Publication Data

US 2005/0225086 A1 Oct. 13, 2005

(51) Int. Cl.
F16L 15/00 (2006.01)

(52) U.S. Cl. ............... 285/390; 285/391; 285/915

(58) Field of Classification Search ........... 285/192, 285/365, 390, 915, 391; 29/456; 403/265, 403/266; 156/293, 294; 411/82, 930

See application file for complete search history.

(56) References Cited

U.S. PATENT DOCUMENTS

| | | | | |
|---|---|---|---|---|
| 2,876,154 A | * | 3/1959 | Usab | 285/915 |
| 3,643,522 A | * | 2/1972 | Fullam | 74/89.44 |
| 3,661,670 A | * | 5/1972 | Pierpont, Jr. | 156/293 |
| 4,863,198 A | * | 9/1989 | Petranto | 285/39 |
| 5,226,678 A | * | 7/1993 | Petranto | 285/356 |
| 5,449,207 A | * | 9/1995 | Hockett | 285/915 |

* cited by examiner

Primary Examiner—Aaron Dunwoody

(57) ABSTRACT

A threaded attachment provides means of applying external threads to elongated members, such as tubes, rods, cables, and the like. The threaded attachment can be expanded to install around an elongated member. When the threaded attachment is compressed or closed around the elongated member, an adhesive liner on the inside surface of the threaded attachment bonds the threaded attachment concentrically to the elongated member.

7 Claims, 2 Drawing Sheets

THREADED ATTACHMENT

BACKGROUND

1. Field of Invention

This invention relates to a threaded attachment that can be applied to the external surface of a variety of shapes such as tubes, rods, cables, and the like. The threaded attachment can be spread apart, then closed around and adhered to the tube, rod, or cable, thereby providing an external threaded section to the tubes, rods or cables.

2. Description of Prior Art

Some present methods of applying a threaded member to the outside of a tube, rod or cable, involve producing a threaded sleeve by machining, molding, casting or similar processes. The threaded sleeve is then installed over one end of the tube and slid to a desired position. After which the threaded sleeve is soldered, brazed, welded or otherwise secured in place. Using this technique requires that there can be no obstructions (such as bends, fittings, etc) in the path the threaded sleeve would take when being moved to its desired location. The processes described are costly and time consuming. They cannot be applied to a pipe, for example, that has permanently attached end fittings after the end fittings are installed.

PRESENT INVENTION—OBJECTS AND ADVANTAGES

The threaded attachment of the present invention can be installed anywhere along the length of an elongated member such as a tube, rod or cable. It can be installed quickly, without special tools or special processes. There is no necessity of sliding the threaded attachment along the tube. The unit can be installed precisely at the desired site. The threaded attachment is inexpensive to manufacture and simple to install. No skilled techniques such as brazing or welding are required.

DRAWING FIGURES

DESCRIPTION

Figure 1:
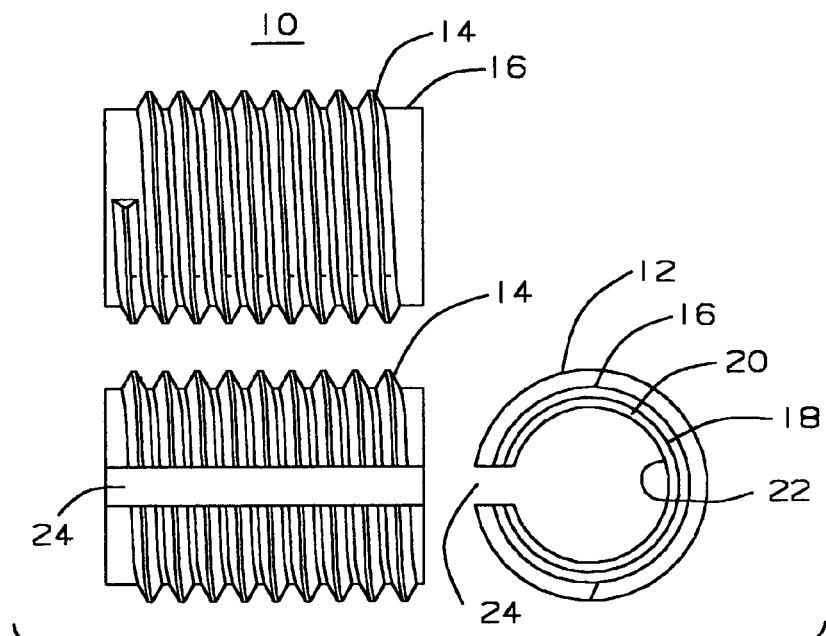
FIG. 1 shows three orthogonal views of the invention.

FIG. 1 shows a preferred embodiment of the present invention. Threaded attachment 10 consists of a sleeve 12 generally cylindrical. On the outside diameter of sleeve 12 is a helical thread 14 extending in depth to root diameter 16. Adhesively attached to the inside diameter 18 of sleeve 12 is an adhesive liner 20. A peel-off strip 22 may be applied to the inside diameter of adhesive liner 20. Longitudinal gap 24 is provided for the length of sleeve 12 to allow the sleeve 12 to be spread apart. Sleeve 12 is made of appropriate flexible material such as flexible plastic.

Figure 2:
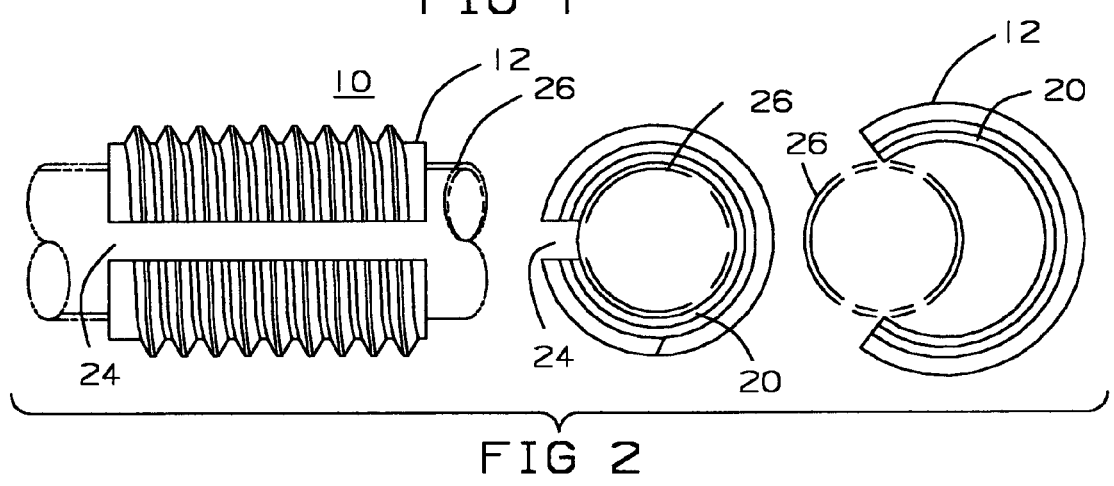
FIG. 2 shows the invention installed on a tube and the expansion for the installation process.

FIG. 2 shows a typical installation of threaded attachment 10 around tube 26. The right hand view shows sleeve 12 spread apart sufficiently to accept tube 26. The center view shows sleeve 12 compressed and concentrically adhered to tube 26 by virtue of the adhesive properties of liner 20. In a preferred embodiment, adhesive liner 20 is constructed with aggressive adhesive applied to both of its sides. Hence, sleeve 12 is permanently attached to tube 26 by the bonding action of liner 20.

Figure 3:
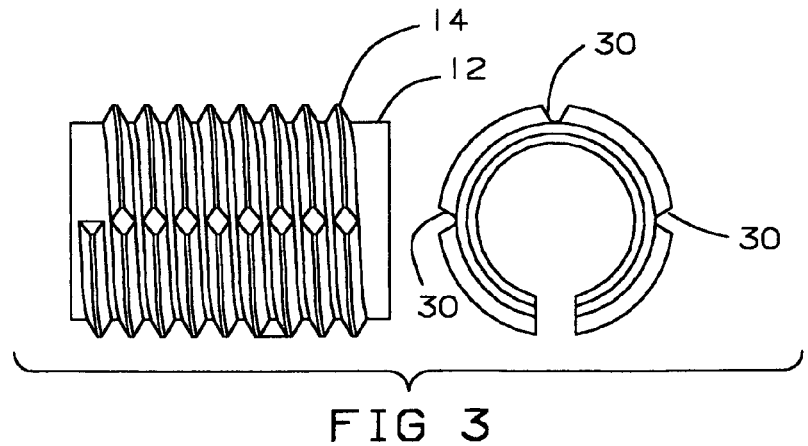
FIG. 3 shows notches in the threads of the invention.

FIG. 3 shows a plurality of notches 30 that extend from the major diameter of the helical threads 14 to approximately the root diameter 16 of threads 14. These notches 30 improve the flexibility for spreading threaded attachment 10 over tube 26 (FIG. 2).

Figure 4:
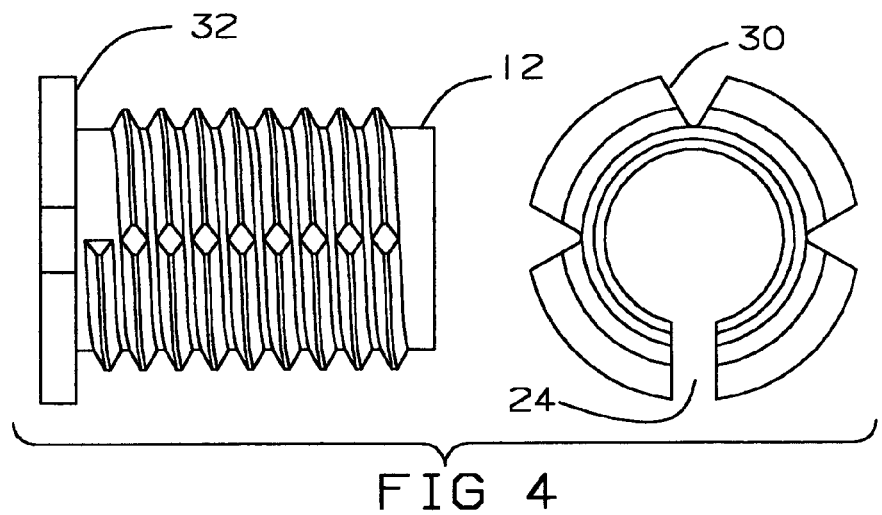
FIG. 4 shows notches and a flange incorporated into the invention.

In a further embodiment of the invention, as in FIG. 4, a flange 32 is shown as part of sleeve 12. Notches 30 are included in flange 32. Gap 24 also extends through flange 32.

Figure 5:
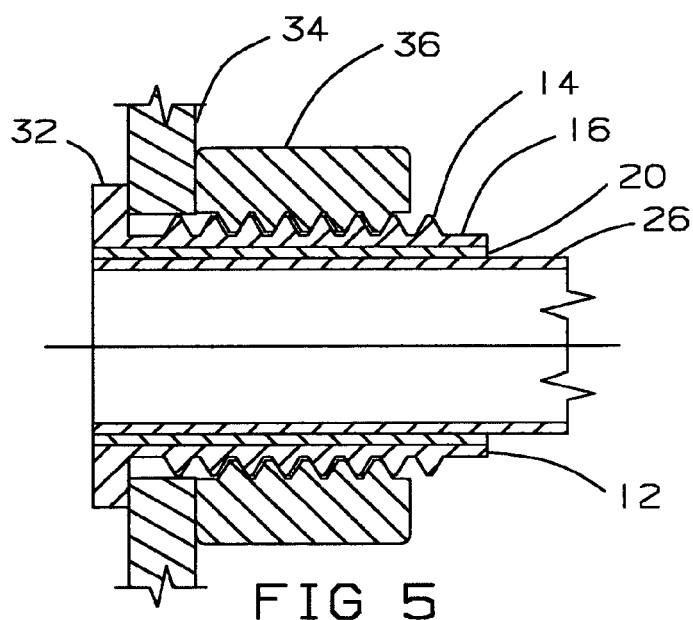
FIG. 5 shows a typical use of the invention to position a panel.

FIG. 5 shows a typical use of this invention. Threaded attachment 10 is attached to the end of tube 26 so that the end of tube 26 is flush with the exterior side of flange 32. Liner 20 adhesively bonds sleeve 12 to tube 26. Panel 34 fits over the helical threads 14 of sleeve 12 and abuts the interior surface of flange 32. A nut 36 engages the helicoil threads 14 and can be tightened to secure panel 34 to flange 32, and hence, to tube 26. This assembly can then be used to support panel 34 as either a pedestal or a hanger, such as in hanging ceiling tiles or fabrication of shelving. Many other applications for this invention exist.

Figure 6:
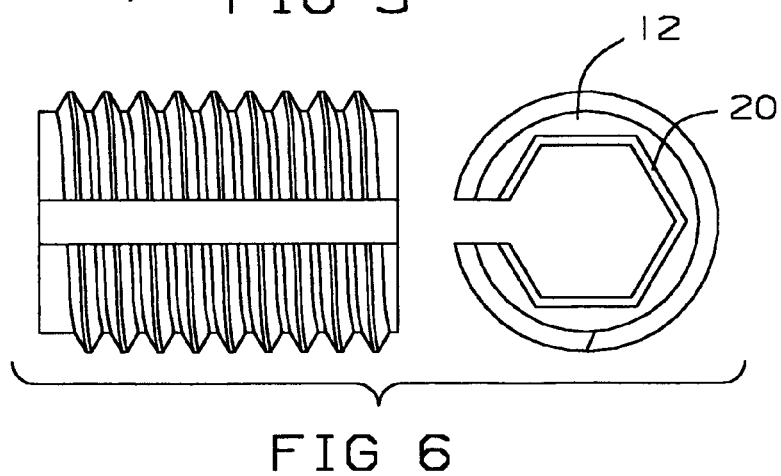
FIG. 6 shows the use of the invention on tubes or rods that are not round.

In FIG. 6, sleeve 12 and liner 20 are configured to fit over a hexagon shaped rod or tube. Many other shapes can be accommodated.

Other systems of obtaining adhesion between the sleeve 12 and the tube 26 are effective. For example, instead of using the double backed tape liner 20, the inside surface of sleeve 12 can be coated directly with an adhesive.

CONCLUSIONS

Accordingly, this invention offers a simple and inexpensive way to apply threads to elongated member such as tubes, rods, cables, and the like. The installation can be rapidly accomplished and requires very little operator skill. The threaded attachment can be easily mass-produced. For these reasons the unit will find acceptance by the novice user.

It will be appreciated that while particular embodiments of the invention have been shown and described, modifications may be made. It is intended in the claims to cover all modifications that come within the true spirit and scope of the invention.

I claim:

1. A threaded attachment for application on an elongated member, comprising:
    a) a sleeve with helical threads on its outside diameter and with a longitudinal gap for its full length, and
    b) a liner adhesively bonded to the inside surface of said sleeve, whereby said gap can be expanded sufficiently to allow said sleeve and said liner to fit over said elongated member, whereby said sleeve and said liner can subsequently be compressed so that said liner contacts said elongated member and adhesively joins said sleeve concentrically to said elongated member, and whereby said elongated member is therefore configured with external threads.

2. The threaded attachment of claim 1 wherein said sleeve is made of flexible plastic.

3. The threaded attachment of claim 1 wherein said outside diameter contains a plurality of notches to improve flexibility.

4. The threaded attachment of claim 1 wherein said sleeve contains a flange.

5. The threaded attachment of claim 4 wherein said flange contains a plurality of notches to improve flexibility.

6. The threaded attachment of claim 1 wherein the inside surface of said sleeve and said liner are configured to accommodate a variety of different shaped elongated members.

7. A method of securing a threaded attachment with an adhesive liner onto an elongated member, comprising the steps of:
 a) spreading said threaded attachment sufficiently to encompass said elongated member,
 b) engaging said threaded attachment over said elongated member, and
 c) compressing said threaded attachment concentrically over said elongated member, whereby said threaded attachment becomes adhesively bonded to said elongated member.

* * * * *